United States Patent
Ma

(10) Patent No.: US 8,520,966 B2
(45) Date of Patent: Aug. 27, 2013

(54) IMAGE BACKGROUND ENHANCEMENT FOR COLOR IMAGES

(75) Inventor: Huanfeng Ma, Drexel Hill, PA (US)

(73) Assignee: The Neat Company, Philadelphia, PA (US)

( * ) Notice: Subject to any disclaimer, the term of this patent is extended or adjusted under 35 U.S.C. 154(b) by 1185 days.

(21) Appl. No.: 12/414,450

(22) Filed: Mar. 30, 2009

(65) Prior Publication Data

US 2010/0246947 A1    Sep. 30, 2010

(51) Int. Cl.
*G06K 9/40* (2006.01)
(52) U.S. Cl.
USPC ............................. 382/254; 382/162; 382/168
(58) Field of Classification Search
USPC ................. 382/162, 164, 168, 170, 171, 173, 382/254, 286
See application file for complete search history.

(56) References Cited

U.S. PATENT DOCUMENTS

| | | | |
|---|---|---|---|
| 7,069,240 B2 | 6/2006 | Spero et al. | |
| 2004/0042680 A1* | 3/2004 | Saund | 382/274 |
| 2004/0105032 A1* | 6/2004 | Kim et al. | 348/607 |
| 2008/0181497 A1* | 7/2008 | Ferman et al. | 382/172 |
| 2010/0189345 A1* | 7/2010 | Reddy et al. | 382/164 |

* cited by examiner

*Primary Examiner* — Phuoc Tran
(74) *Attorney, Agent, or Firm* — Woodcock Washburn LLP

(57) ABSTRACT

A technique is provided for enhancing the background of an original document image. In the case of a black-and-white image, the background color of the original document image is detected, the desired enhanced background color of the original document image is determined from a background pixel value $P_b$ that is in the center of the background color range, and the original document image is enhanced to the desired enhanced background color. However, if the background of the original document image is in color, the technique further includes obtaining color image histograms of red, blue and green colors of the original document image, smoothing the histograms, and comparing the histograms to determine if they have the same shape. If the histograms do not have the same shape, and hence the background is in color, the background color of the original document image is detected for each color channel and the background color is enhanced for each channel based on table values so that the hue of the background is not changed.

15 Claims, 16 Drawing Sheets

IMAGE BACKGROUND ENHANCEMENT FOR COLOR IMAGES

TECHNICAL FIELD

The invention relates to background enhancement techniques for images and, more particularly, to techniques for making a color image brighter without changing its hue.

BACKGROUND OF THE INVENTION

Contrast adjustment and gamma correction are two standard and effective image enhancement approaches. They work well for pictures of natural scenes having abundant colors. However, for document images captured either by scanners or cameras, these two methods often fail because:

1. Document images, especially images captured from black-white documents often have non-continuous color changes. These non-continuous color changes make the image very sensitive to the enhancement approach. Once enhancement fails, the image quality will be significantly degraded which will significantly reduce the quality of the OCR (Optical Character Recognition) result.

2. On a regular document image, the amount of foreground pixels (usually text) is much less than the amount of background pixels (white paper). It is almost impossible to set a fixed threshold to determine the cutting point of background versus foreground as in the standard contrast adjustment approach. On the other hand, the standard gamma correction approach changes the brightness of both foreground and background which makes the image a little blurry. Such a change might be desirable for images with natural scenes but definitely is not desirable for document images.

3. Because of the skewing of documents during scanning, the scanning background (often very dark) will affect the results of both contrast adjustment and gamma correction.

4. Wrinkles of physical documents often affect the scanned image quality. Neither standard contrast adjustment nor gamma correction is able to remove these wrinkles. The wrinkles thus appear as noise on the scanned images.

FIG. 1 illustrates an example of contrast adjustment and gamma correction result for an original image with a natural scene (FIG. 1($a$)). It is easy to tell that contrast adjustment makes the image sharper (FIG. 1($b$)) while gamma correction makes the image brighter (of course it can be made darker) (FIG. 1($c$)). In contrast, FIG. 2 shows the correction results for a receipt image with the same parameters as those used in FIG. 1 (e.g., head and tail contrast adjustment percentage 10% and gamma value 0.5). Although contrast adjustment makes the image sharper, it also makes the noise sharper which will affect the OCR result. Also, although gamma correction makes the image brighter, it also makes the foreground blurry which is not desirable for OCR either. FIG. 2($d$) shows the desired enhancement result made possible in accordance with the invention. As illustrated, the foreground text is maintained while the background is brightened. Also, wrinkles that appeared on the original image are removed.

A technique for bringing about such enhancement results is desired and is described herein for the enhancement of color images.

SUMMARY OF THE INVENTION

A technique is provided for providing background color enhancement of images, particularly scanned images that are to be processed for reading by an optical character reader (OCR). Although the techniques described herein were initially designed for processing receipt document images in an exemplary embodiment, those skilled in the art will appreciate that the techniques described herein may be readily applied to many other types of documents with a black-and-white or color background as desired.

In an exemplary embodiment, a technique is provided for enhancing the background of an original document image by detecting the background color of the original document image, determining the desired enhanced background color of the original document image from a background pixel value $P_b$ that is in the center of the background color range, and enhancing the original document image to the desired enhanced background color. If the background of the original document image is in color, the technique further includes obtaining color image histograms of red, blue and green colors of the original document image, smoothing the histograms, and comparing the histograms to determine if they have the same shape. If the histograms do not have the same shape, and hence the background is in color, the background color of the original document image is detected for each color channel and the background color is enhanced for each channel based on table values so that the hue of the background is not changed.

In an exemplary embodiment, the factors $F_l$ and $F_r$ are calculated as follows:

$$F_l = \begin{cases} \beta & \text{if } P_b \geq T_{ghigh} \\ \alpha & \text{Otherwise} \end{cases}$$

$$F_r = \begin{cases} \alpha & \text{if } P_b \leq T_{glow} \\ \beta & \text{Otherwise} \end{cases}$$

where values $\alpha$ and $\beta$ are decided based on experimental values and where $T_{ghigh}$ and $T_{glow}$ are high and low pixel thresholds, respectively. The factor values $F_l$ and $F_r$ are then fed to a function to find the left pixel value $P_{lb}$ of the background color range as a function of the histogram of $P_b$ divided by $F_l$ and the right pixel value $P_{rb}$ of the background color range as a function of the histogram of $P_b$ divided by $F_r$, whereby pixel values in the color range defined by $P_{lb}$ and $P_{rb}$ are determined to be part of the image background.

In an exemplary embodiment, determining the desired enhanced background color $P_{eb}$ of the original document image from $P_b$ comprises determining $P_{eb}$ as:

$$P_{eb} = \begin{cases} N & \text{if } P_b \geq P_{gwmin} \\ P_{gbmax} & \text{if } P_b < P_{gbmax} \\ P_b & \text{Otherwise} \end{cases}$$

where $P_{gwmin}$ is the minimum pixel value that can be safely set to white on the enhanced image and $P_{gbmax}$ is the maximum pixel value that can be safely considered as black on the enhanced image, and N is the pixel resolution of the original image. In such an embodiment, enhancing the original document image to the desired enhanced background color comprises generating look-up tables as follows:

if $P_{eb}$ is N, generating a look-up table LT as follows, where i is the grayscale image pixel value in the range [0,N], and B is a small value that can always be safely set to pure black value 0:

$$LT(i) = \begin{cases} 0 & i \leq B \\ N & i \geq P_{lb} \\ \dfrac{N \cdot (i-B)}{P_{lb}-B} & \text{Otherwise;} \end{cases}$$

if $P_{eb}$ is not N, generating a look-up table LT as:

$$LT(i) = \begin{cases} P_{eb} & \text{if } P_{lb} \leq i \leq P_{rb} \\ i & \text{Otherwise} \end{cases} ; \text{ and}$$

enhancing the image background such that for each image pixel with value p on the original image the pixel value is changed from p to LT(p).

In an exemplary embodiment for enhancing images with colored backgrounds, the red, green, and blue histograms are smoothed by calculating for an image histogram H, a smoothing range R, and a pixel resolution N, the smoothed histogram $H_s$ as:

$$H_s(i) = \frac{1}{2R+1} \sum_{j=i-R}^{i+R} H(j), (i = 0, 1, \ldots, N).$$

In such an embodiment, detecting the background color of the original document image comprises finding all peaks in the color image histograms, determining factors $F_l$ and $F_r$ as a function of one or more of the peak pixel values in the color image histograms, and providing factor values $F_l$ and $F_r$ to a function to find the left pixel value $P_{lb}$ of the background color range and the right pixel value $P_{rb}$ of the background color range, whereby pixel values in the color range defined by $P_{lb}$ and $P_{rb}$ are determined to be part of the color image background.

In the case of a colored background, determining the desired enhanced background color $P_{eb}$ of the original document image comprises generating look-up tables as follows:

if $P_{eb}$ for a red, green, or blue color channel has a value of N, generating a look-up table LT as follows, where i is the image pixel value of a specific color channel that is in the range [0, N], B is a small value that can always be safely set to pure black value 0, and $P_{lb}$ takes the value of $P_{lbRed}$, $P_{lbGreen}$ or $P_{lbBlue}$ depending on the color channel:

$$LT(i) = \begin{cases} 0 & i \leq B \\ N & i \geq P_{lb} \\ \dfrac{N \cdot (i-B)}{P_{lb}-B} & \text{Otherwise;} \end{cases}$$

if $P_{eb}$ for the red, green or blue color channel does not have a value of N, generating a look-up table LT as follows, where $P_{rb}$ takes the value of $P_{rbRed}$, $P_{rbGreen}$ or $P_{rbBlue}$ depending on the color channel:

$$LT(i) = \begin{cases} P_{eb} & \text{if } P_{lb} \leq i \leq P_{rb} \\ i & \text{Otherwise} \end{cases} ; \text{ and}$$

enhancing the image background such that for each image pixel with value p in a specific color channel of the original document image the pixel value is changed from p to LT(p) in that channel.

In a further exemplary embodiment, if one channel of background color is set to a saturated value N, a color changing value $C_{Color}$ for red, green, and blue, respectively, is computed as:

$$C_{Color} = \begin{cases} N - P_{bColor} & \text{if } P_{ebColor} = N \\ 0 & \text{Otherwise.} \end{cases}$$

If any calculated value of $C_{Color}$ has a non-zero value, then a color saturation pixel threshold $P_s$ is computed as $P_s = N - \max(C_{Red}, C_{Green}, C_{Blue})$ and a look-up table LT2 is generated for the color adjustment as follows, where i is the image pixel value of the color channel that is in the range [0, N]:

$$LT2(i) = \begin{cases} N & \text{if } i \geq P_s \\ \dfrac{i \cdot N}{P_s} & \text{Otherwise.} \end{cases}$$

As will be apparent from the following description, the invention also encompasses systems and computer readable storage media containing instructions for implementing the techniques of the invention as described herein.

BRIEF DESCRIPTION OF THE DRAWINGS

The foregoing summary, as well as the following detailed description of various embodiments of the present invention, will be better understood when read in conjunction with the appended drawings. For the purpose of illustrating the embodiments, there are shown in the drawings embodiments which are presently preferred. It should be understood, however, that the embodiments of the present invention are not limited to the precise arrangements and instrumentalities shown.

FIGS. 2(a)-2(c) show the correction results for a receipt image with the same parameters as those used in FIG. 1, while FIG. 2(d) illustrates a desired correction result.

DETAILED DESCRIPTION OF ILLUSTRATIVE EMBODIMENTS

Exemplary embodiments of the invention will be described in detail below with reference to FIGS. 3-16. Those skilled in the art will appreciate that the description given herein with respect to those figures is for exemplary purposes only and is not intended in any way to limit the scope of the invention. All questions regarding the scope of the invention may be resolved by referring to the appended claims.

Exemplary System

Figure 3:
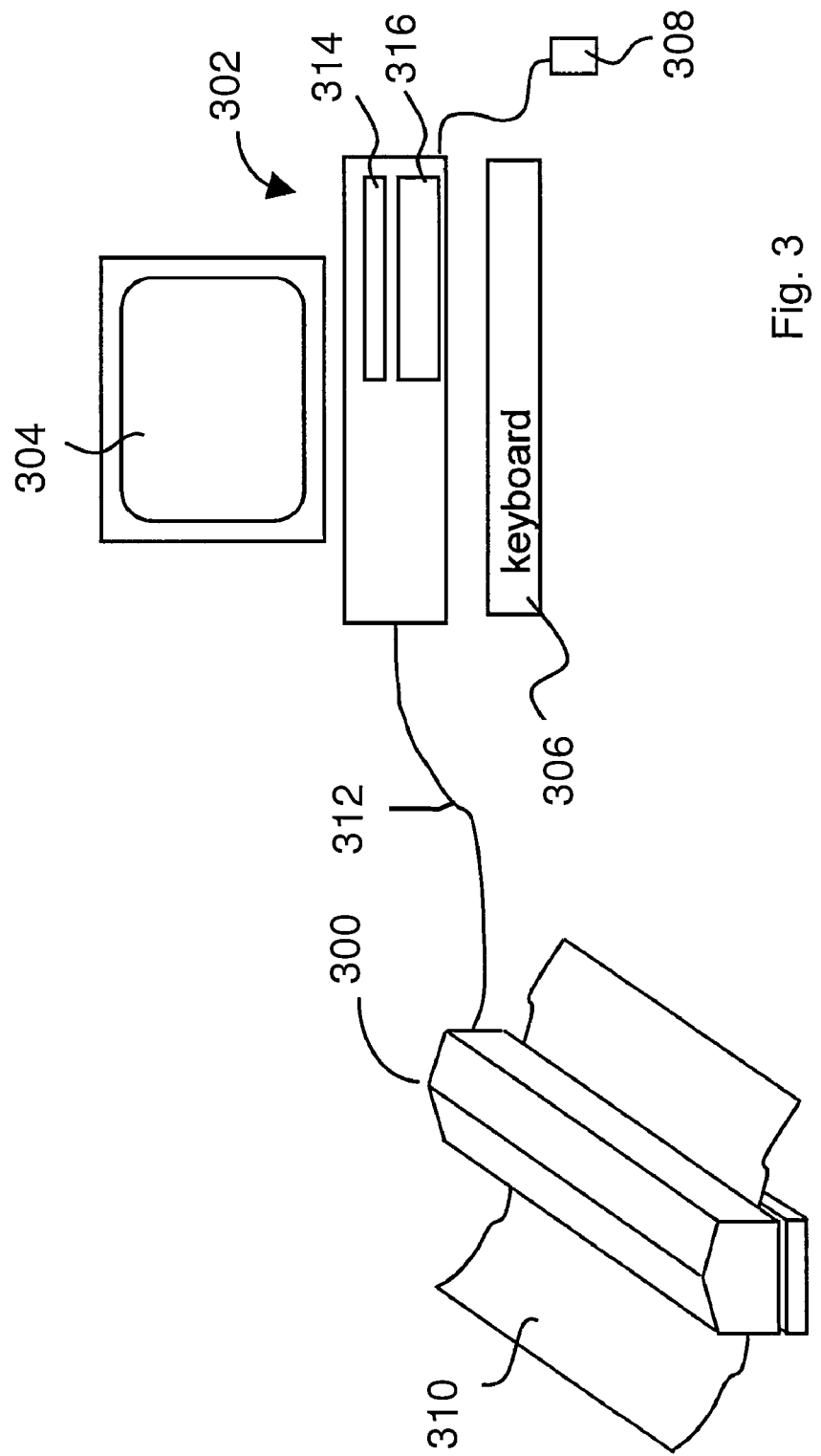
FIG. 3 illustrates a schematic diagram of a portable scanning system that may be adapted to scan documents for image enhancement using the techniques of the invention

FIG. 3 illustrates a schematic diagram of a portable scanning system that may be adapted to scan documents for image enhancement using the techniques of the invention. Of course, the techniques described herein may also be used with conventional, non-portable scanning systems as well. As illustrated in FIG. 3, sheet-fed scanner 300 is connected through communication cable 312 to a computing device 302, which may be a desktop or laptop computer, for example. Scanner 300 scans a sheet 310, which may be a sheet of paper, a receipt, a business card, or the like, and digitizes the text and graphics thereon in a conventional manner. The scanning result is generally a digital image that is transferred to the computing device 302 through communications cable 312. The digital image may then be manipulated by a computer program executed by computing device 302. The computer program as executed by computing device 302 may implement various aspects of the claimed method as explained below. Thus, the computing device 302 is a machine that implements the method described herein.

The computing device 302 includes a display monitor 304 on which the scanned image and/or cropped image is displayed to users. Computing device 302 may optionally include a memory slot 314, a disk drive 316 for storing image files and application program files, and a keyboard 306 for providing data input. A mouse 108 is also provided to permit execution of commands by the computing device 302.

Figure 1:
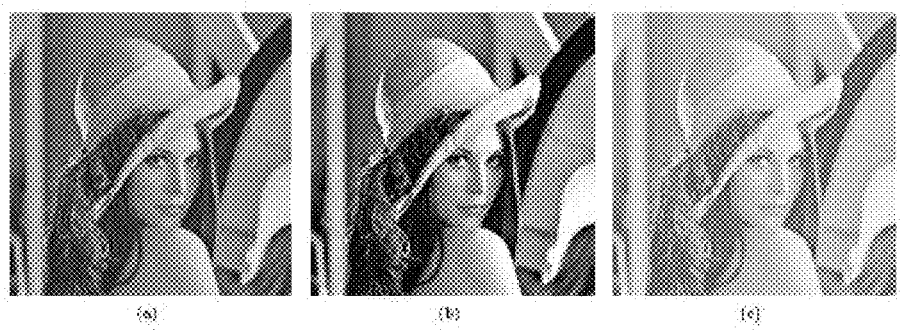
FIG. 1 illustrates an example of contrast adjustment and gamma correction result for an original image with a natural scene.
Figure 2:
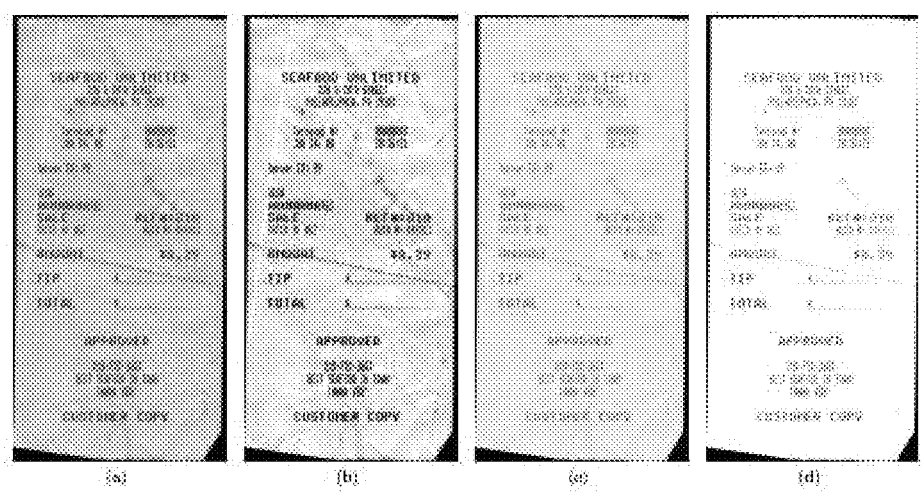

In an exemplary embodiment, the computer program executed by the computing device 302 of FIG. 1 analyzes the images received from the scanner 300, converts the images to text, analyzes the text data, extracts expense data, and puts the extracted expense data into an expense report. In another exemplary embodiment, the computer program executed by the computing device 302 of FIG. 1 analyzes business card or other documents images received from the scanner 300, converts the images to text, analyzes the text data, extracts contacts data, and puts the contacts data into a contacts database. An exemplary system for capturing, storing and processing documents, such as receipts and business cards, are described in U.S. Pat. No. 7,069,240. The contents of that patent are hereby incorporated by reference in their entirety.

Grayscale Image Background Enhancement

Figure 4:
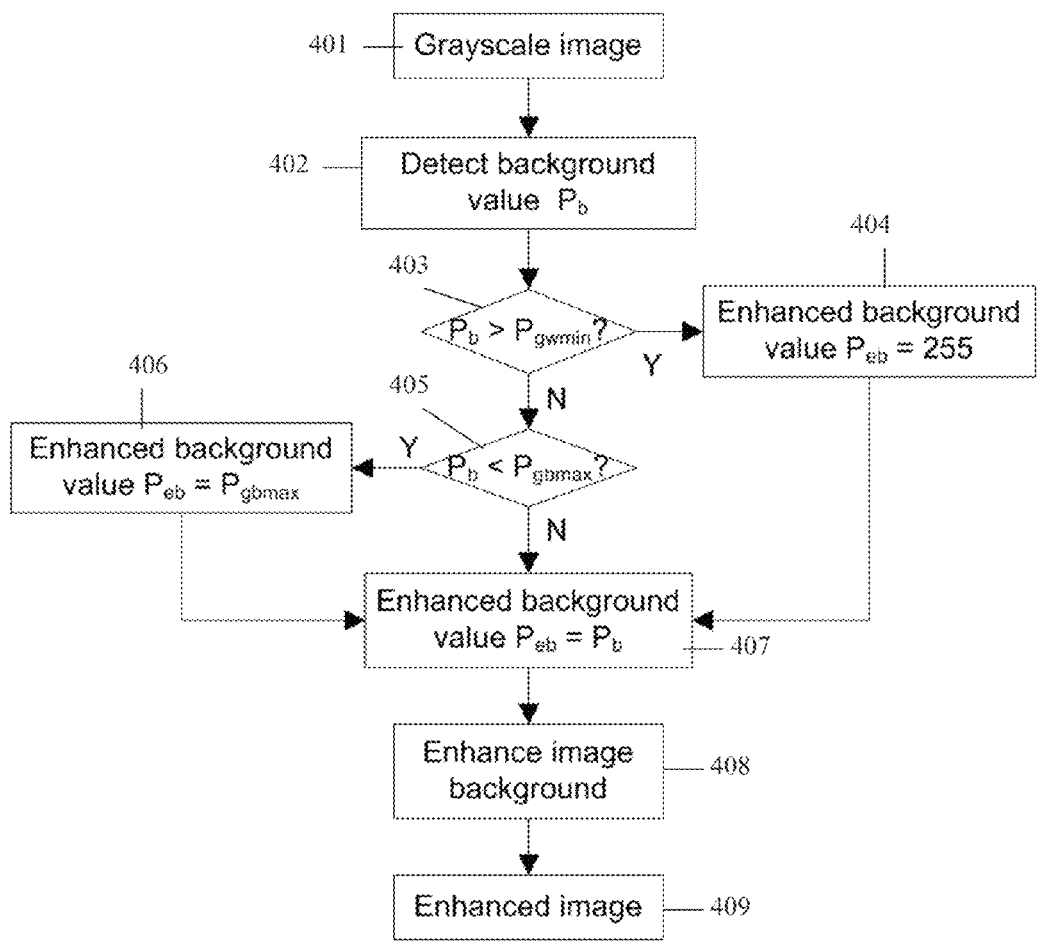
FIG. 4 illustrates an exemplary grayscale image background enhancement technique that may be used in accordance with the invention.

Since each pixel on a grayscale image can be represented by one single value, and human eyes are less sensitive to grayscale value changes than to color changes, methods for enhancing grayscale images are generally straightforward. For example, FIG. 4 illustrates a grayscale image background enhancement technique that may be divided into three major steps: (1) detect the original image background value $P_b$ (402) from an input grayscale image (401); (2) determine the enhanced image background value by measuring $P_b$ against minimum (e.g., $P_{gwmin}$=white) and maximum ($P_{gbmax}$) grayscale values (403-407); and (3) enhance image background (408) to produce an enhanced image (409). Each step will be described in detail below.

1. Background Detection (Step 402)

Since the background is always the largest part of a document image, the detection of the original image background is transformed into finding the pixel value corresponding to the peak in the image histogram. By predefining a maximum single-direction background pixel value variation $R_b$, the detected background pixel value is in a range of $[P_{lb}; P_{rb}]$ with center pixel value $P_b$, where max $P_{rb}-P_{lb}\leqq 2R_b$. The variation value $R_b$ should be decided based on experimental results; for example, $R_b$=20 has been found to give good performance. After presetting two pixel value thresholds $T_{ghigh}$ and $T_{glow}$, given the image histogram H, the procedure to detect the original image background is as follows, where $T_{ghigh}$ and $T_{glow}$ are set to 200 and 50 for N=255, respectively:

1. Find the pixel value $P_b$ of background pixels as follows, where $P_{black}$ is the pixel value that definitely should be considered as black and is set to 20:

$$P_b = \underset{P_{black} < p \leq N}{\operatorname{argmax}} H(p) \qquad (1)$$

2. Decide two factors $F_l$ and $F_r$ that will be used to reduce the peak values $H(P_b)$ and further to find the left and right pixel values $P_{lb}$ and $P_{rb}$ of the background range. $F_l$ and $F_r$ are decided as follows:

$$F_l = \begin{cases} 25 & \text{if } P_b \geq T_{ghigh} \\ 1 & \text{Otherwise} \end{cases} \qquad (2)$$

$$F_r = \begin{cases} 1 & \text{if } P_b \leq T_{glow} \\ 25 & \text{Otherwise} \end{cases} \qquad (3)$$

where value 1 and 25 are decided based on experimental values and can certainly be other values if they are found to provide better performance.

3. Combined with the histogram H and the detected value $P_b$, the two decided factor values $F_l$ and $F_r$ are fed to a function FindCuttingPoint( ) to find the left and right pixel values $P_{lb}$ and $P_{rb}$ of the background range as distinct from the foreground. The flowchart of the function FindCuttingPoint( ) is shown in FIG. 5.

Figure 5:
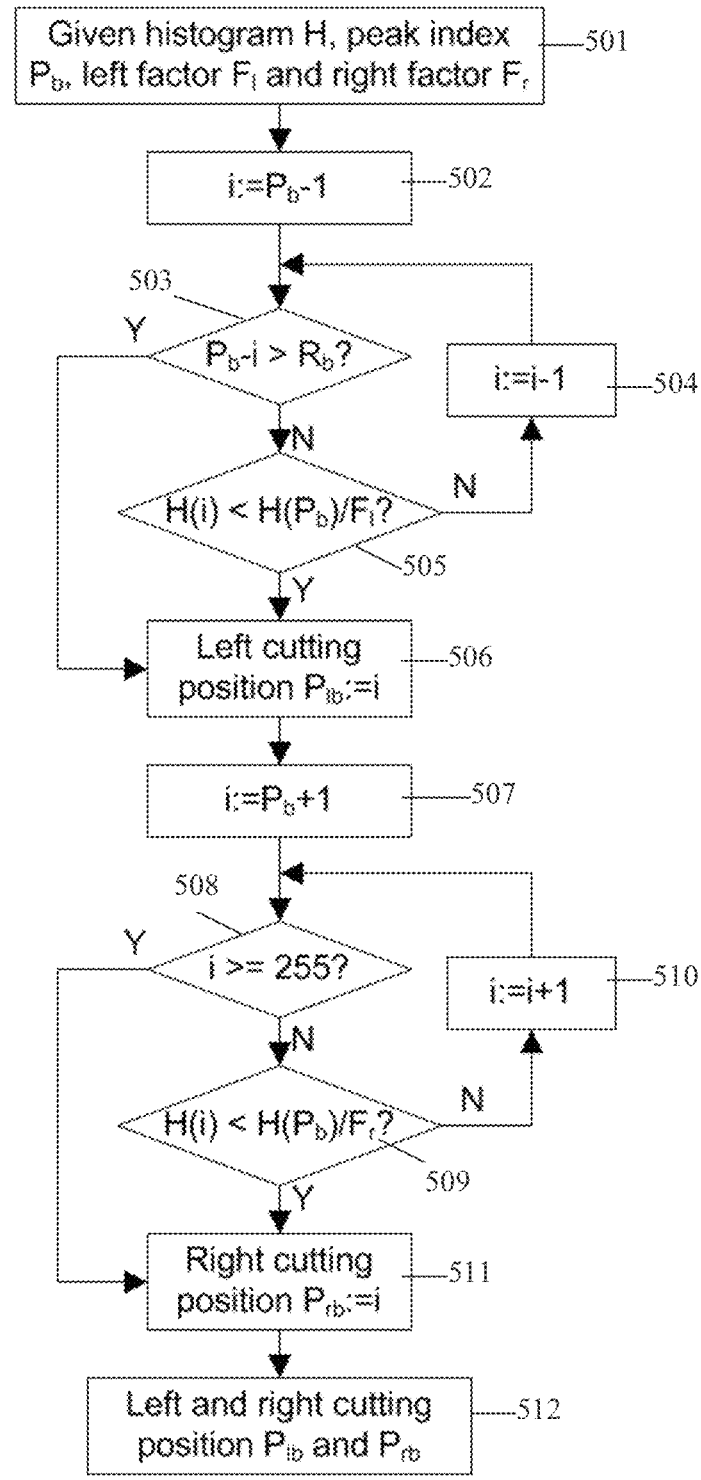
FIG. 5 is a flowchart of the function FindCuttingPoint( ) used for background detection in an exemplary embodiment.

As illustrated in FIG. 5, FindCuttingPoint( ) starts at 501 by reading in histogram H of the original grayscale image, the peak index $P_b$, the left factor $F_l$, and the right factor $F_r$, as defined above for the original image. At 502, the loop index i is set to $P_b-1$. If it is determined at 503 that $P_b-i$ is not greater than $R_b$, then H(i) is checked at 505 to determine if it is less than $H(P_b)/F_l$. If not, index i is decremented at 504 and 503, 505 are repeated for the next index value. Once H(i) is less than $H(P_b)/F_l$, then the left cutting position $P_{lb}$ is assigned to the current index value i. The right cutting position $P_{rb}$ is similarly determined at 507-511 by checking at 508 if the index i value is greater than or equal to a predetermined value for white (e.g., 255) and the index i is incremented until a right cutting position is found for the current index value i. The left and right cutting positions $P_{lb}$ and $P_{rb}$ are output at 512.

Once the original image background range is detected, the detected values $P_{lb}$ and $P_{rb}$ are passed to the next step to determine the enhanced image background.

2. Decide Enhanced Image Background and Perform Enhancement (Steps 403-408)

Once the original background value center $P_b$ is obtained, the enhanced background value $P_{eb}$ is determined as follows:

$$P_{eb} = \begin{cases} N & \text{if } P_b \geq P_{gwmin} \\ P_{gbmax} & \text{if } P_b < P_{gbmax} \\ P_b & \text{Otherwise} \end{cases} \quad (4)$$

where $P_{gwmin}$ is the minimum pixel value that can be safely set to white on the enhanced image ($P_{gwmin}=150$ in an exemplary implementation), $P_{gbmax}$ is the maximum pixel value that can be safely considered as black on the enhanced image ($P_{gbmax}=50$ in the exemplary implementation), and N is the resolution.

After the enhanced image background is decided, the enhancement is performed as follows:

1. If $P_{eb}$ is N (e.g. 255), generate a look-up table LT as follows, where B is a small value that can always be safely set to pure black value 0 (e.g. for N=255, B may be 5), and where i is the grayscale image pixel value in the range [0,N]:

$$LT(i) = \begin{cases} 0 & \text{if } i \leq B \\ N & \text{if } i \geq P_{lb} \\ \frac{N \times (i - B)}{P_{lb} - B} & \text{Otherwise} \end{cases} \quad (5)$$

2. If $P_{eb}$ is not N (not white), generate a look-up table LT as:

$$LT(i) = \begin{cases} P_{eb} & \text{if } P_{lb} \leq i \leq P_{rb} \\ i & \text{Otherwise} \end{cases} \quad (6)$$

3. Enhance the image background such that for each image pixel with value p on the original image the pixel value is changed from p to LT(p).

Figure 6:
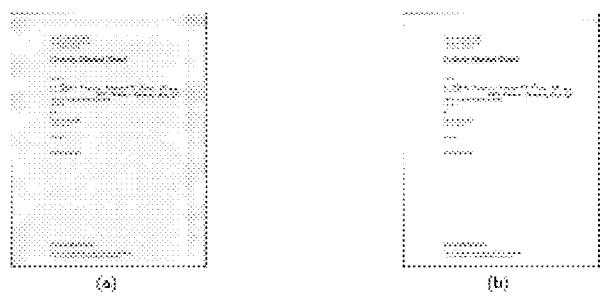
FIG. 6 illustrates a grayscale image enhancement example where print-throughs on the original image are totally removed.
Figure 7:
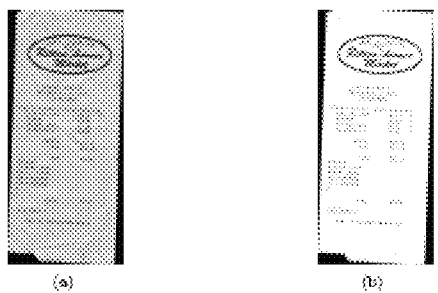
FIG. 7 illustrates a grayscale image enhancement example where noise and wrinkles on the original image are removed.

FIGS. 6 and 7 illustrate grayscale image enhancement examples where print-throughs on the original image are totally removed (FIG. 6) and where noise and wrinkles on the original image are removed (FIG. 7).

Color Image Background Enhancement

Taking a standard RGB color image as an example, different from grayscale images, each pixel on a color image is represented with three values (red, green and blue). On the other hand, human eyes are much more sensitive to changes of colors than grayscale values. Therefore, the color image background enhancement is much more complicated because it involves the histogram of three color channels and must preserve the original generic background color, which means that the background can not be changed from red to non-red or from gray to non-gray, for example. A flowchart illustrating RGB color image background enhancement in accordance with the invention is illustrated in FIG. 8.

Figure 8:
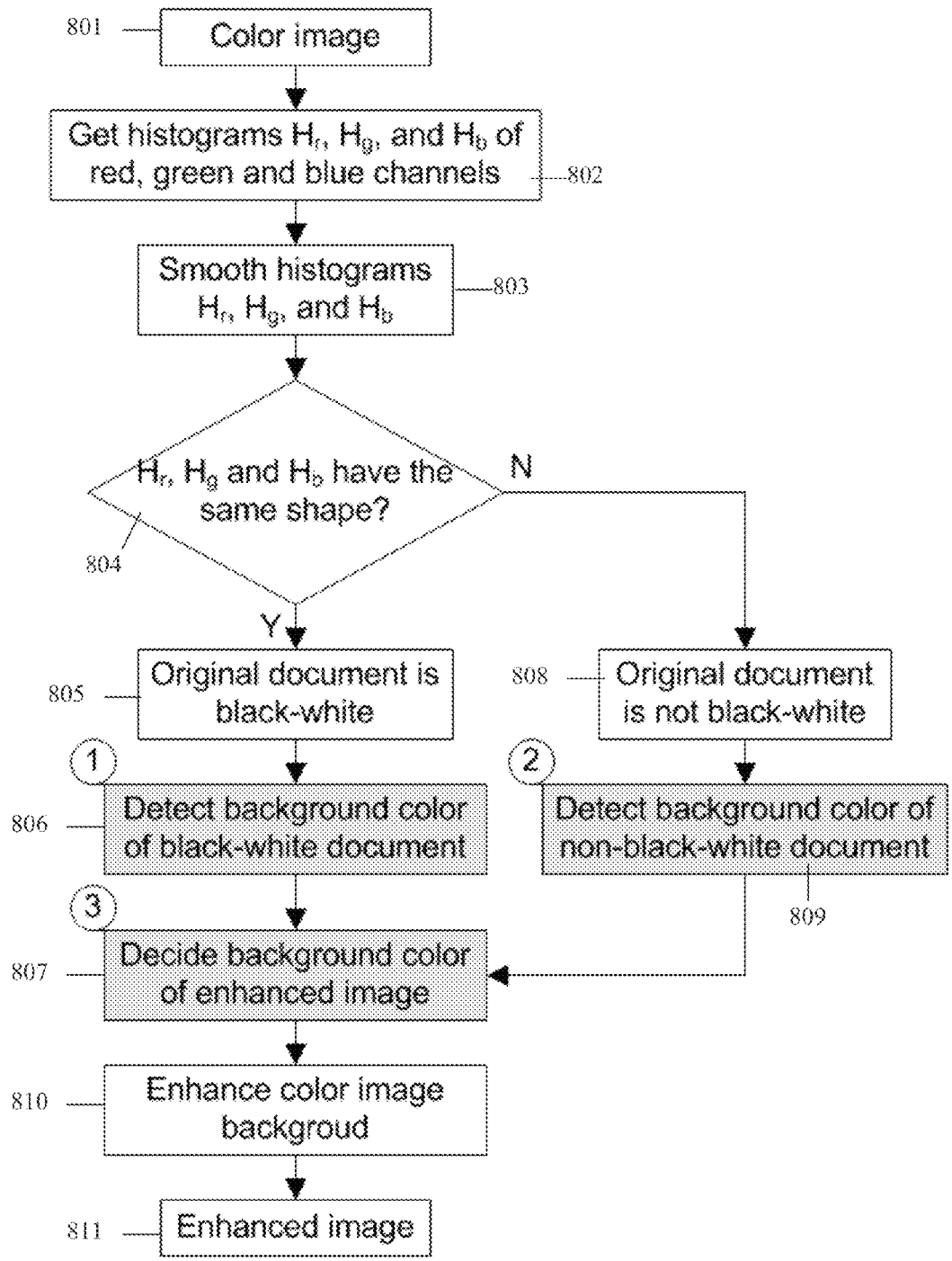
FIG. 8 is a flowchart illustrating RGB color image background enhancement in accordance with the invention.

As illustrated in FIG. 8, a digital color image is received at 801 and the histograms of the red ($H_r$), green ($H_g$) and blue ($H_b$) channels are acquired at 802. The histograms $H_r$, $H_g$ and $H_b$ are smoothed at 803 and the shapes of the histograms are compared at 804 to determine if they have the same shapes. If they have the same shapes, then it is determined at 805 that the original document is black-and-white and the background color of the black-and-white document is detected at 806. The background color of the enhanced black-and-white image is then determined at 807. However, if the histograms do not have the same shapes, then it is determined at 808 that the original document is not black-and-white and the background color of the non-black-and-white document is detected at 809. As with the black-and-white document, the enhanced non-black-and-white document's background color is then determined at 807. The color image background is enhanced at 810 to provide the enhanced image at 811. The key processing blocks of FIG. 8 will be discussed in further detail below.

Background Detection

Histogram Smoothing (Step 803)

The detection of original image background color is based on finding the peak on the image histogram. Instead of one single histogram, a color image has three histograms that correspond to three (red, green and blue) channels of the image. On a color image, because of the color variations, the pixel values in three channels are often not continuous like on a grayscale image. The non-continuity of pixels values make the image histogram have many false peaks that affect the background color detection of the original image. Therefore, the histograms of the three channels are smoothed.

Given an image histogram H and a smoothing range R (R is given a value of 5 in an exemplary implementation), the smoothed histogram $H_s$ is obtained as:

$$H_s(i) = \frac{1}{2R+1} \sum_{j=i-R}^{i+R} H(j), (i = 0, 1, \ldots, N).$$

Figure 9:
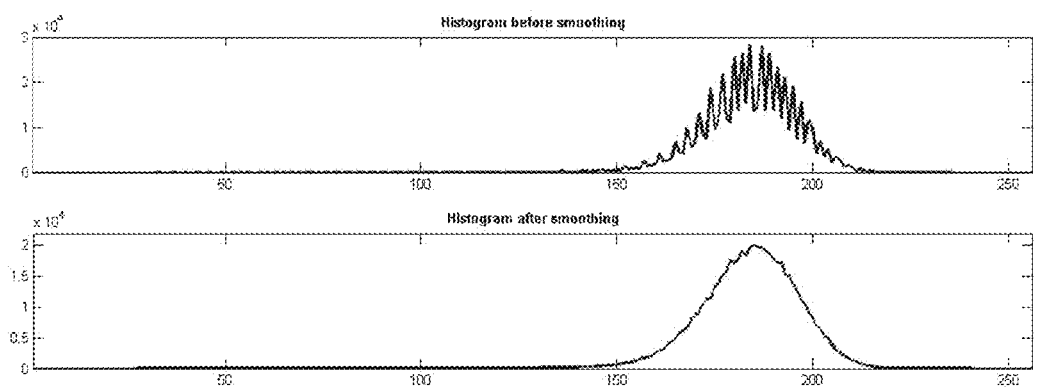
FIG. 9 is an example of a histogram before and after smoothing.

FIG. 9 gives an example of a histogram before and after smoothing. It should be noted that the original image is not changed by the histogram smoothing. In other words, what gets smoothed is the image histogram but not the original image.

Detect Black-and-White Document Image (Step 805)

Since many documents are real black-and-white documents, detection of images captured from these documents can simplify the enhancement. Therefore, after histogram smoothing, three smoothed histograms $H_r$, $H_g$ and $H_b$ will be fed to a black-white document detection function to check if the color image is captured from a black-and-white document. The detection of black-and-white document images at 806 is only used to simplify the enhancement; it does not need to have high accuracy. Advantageously, since the running speed is a factor of concern to the designer, the procedure for detection of black-and-white document images can be very simple and fast. The first step of detection is to compute the histogram difference of three histograms as:

$$D = \sum_{i=0}^{N} (|H_r(i) - H_g(i)| + |H_r(i) - H_b(i)| + |H_g(i) - H_b(i)|) \quad (7)$$

Given the total number of pixels on the original image TNP, the decision is made as such that if D<TNP, the image is determined to be captured from a black-and-white document, while if D≧TNP, the image is determined to be captured from a non-black-and-white document.

Detect Background of Black-and-White Document Images (Step 806)

Figure 10:
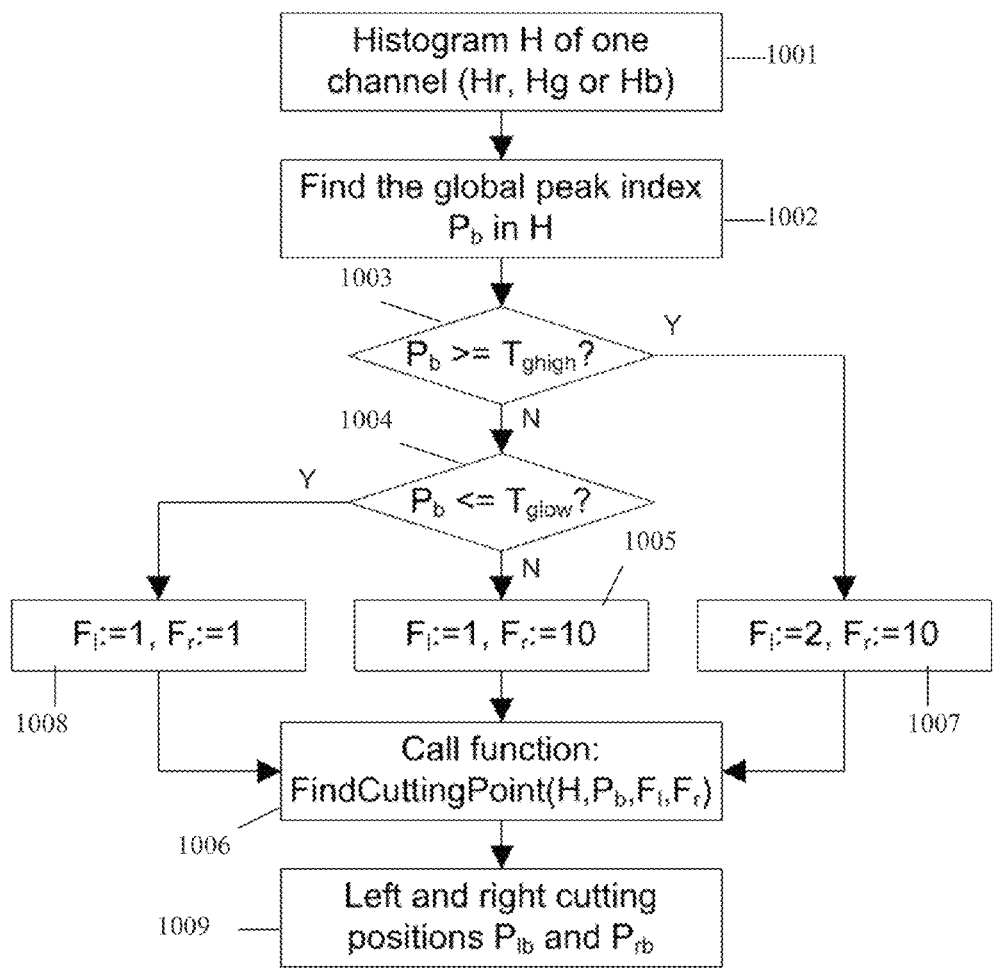
FIG. 10 illustrates an exemplary embodiment of a technique for detecting the background color of a color image generated from a black-and-white document.

Once a color image is detected as captured from a black document image at 805, the next step is to detect the background of the black-and-white image as illustrated in detail in FIG. 10. In the flowchart of FIG. 10, $T_{ghigh}$ and $T_{glow}$ are two thresholds decided from experimental results. They are set to be 200 and 50, respectively in an exemplary implementation. These two thresholds are used to decide the values of a pair of factors $F_l$ and $F_r$ (which have the same meanings as in grayscale image enhancement described above). Combined with the histogram H and detected peak pixel value $P_b$, the decided factors $F_l$ and $F_r$ are fed to the function FindCuttingPoint( ) (shown in FIG. 5) to find the left and right cutting positions $P_{lb}$ and $P_{rb}$ of the background pixel values. It should be noted that $P_b$, $P_{lb}$ and $P_{rb}$ have exactly the same meaning as they have in grayscale image enhancement above and are used to decide the background pixel value of the enhanced image.

As illustrated in FIG. 10, the histogram H of one of the channels $H_r$, $H_g$ and $H_b$ is received at 1001 and used to find the global peak index $P_b$ in H at 1002. If $P_b$ is determined at 1003 to be greater than or equal to $T_{ghigh}$, then the background of the document is determined to be light and the value of $F_l$ is set to 2 and $F_r$ is set to 10 at 1007. If $P_b$ is less than $T_{ghigh}$, then $P_b$ is compared to $T_{glow}$ at 1004. If $P_b$ is determined at 1004 to be less than $T_{glow}$, then the background of the document is determined to be dark and the value of $F_l$ is set to 1 and $F_r$ is set to 1 at 1008. Otherwise, the value of $F_l$ is set to 1 and $F_r$ is set to 10 at 1005. Once the values of $F_l$ and $F_r$ are set, the function FindCuttingPoint( ) is called at 1006 and given the values for H, $P_b$, $F_l$, and $F_r$ for computation of the left and right cutting positions $P_{lb}$ and $P_{rb}$ at 1009. These cutting positions are then used to distinguish the background of the received color document from the text (non-background).

Detecting the Background of Non-Black-and-White Document Images (Step 809)

Figure 11:
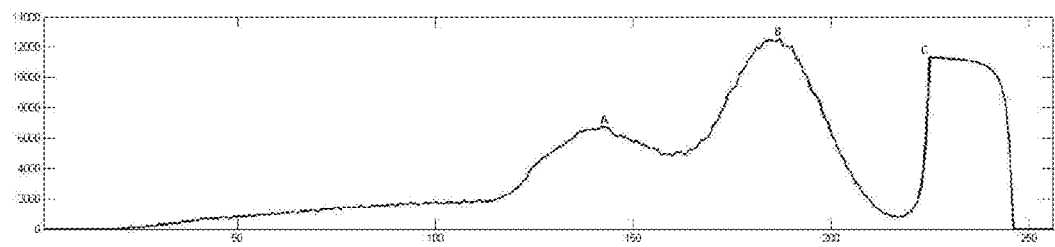
FIG. 11 shows the histogram of the green channel of a color image and illustrates that the green channel histogram may have multiple peaks.
Figure 12:
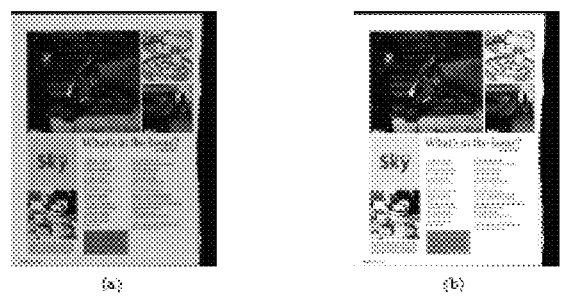
FIG. 12 illustrates a first color image background enhancement example where (a) is the original image and (b) is the image enhanced using the techniques of the invention.
Figure 13:
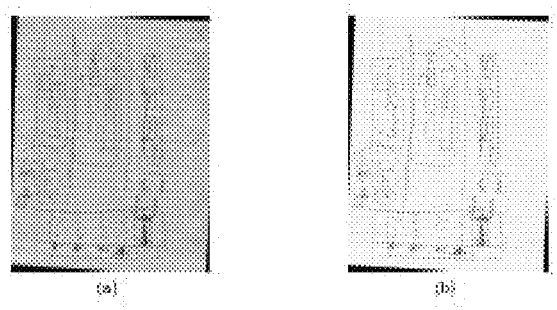
FIG. 13 illustrates a second color image background enhancement example where (a) is the original image and (b) is the image enhanced using the techniques of the invention.
Figure 14:
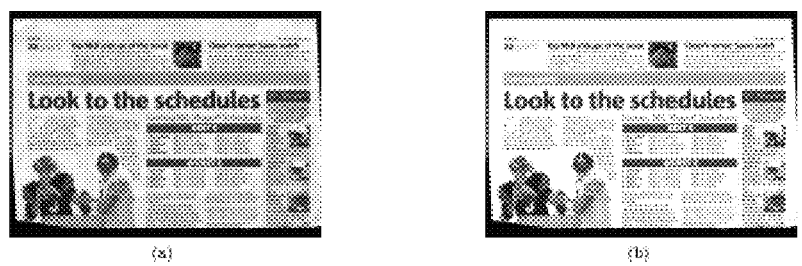
FIG. 14 illustrates a third color image background enhancement example where (a) is the original image and (b) is the image enhanced using the techniques of the invention.
Figure 15:
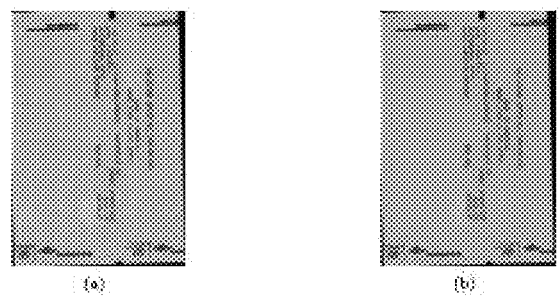
FIG. 15 illustrates a fourth color image background enhancement example where (a) is the original image and (b) is the image enhanced using the techniques of the invention.

The detection of background color of non-black-and-white document images is much more complicated than black-and-white document images. In grayscale image enhancement, one single peak (global peak) may be found to detect the background value since grayscale image pixel values are usually continuous. However, different from grayscale images, there is a high possibility that multiple peaks may appear in the histogram of color images. FIG. 11 shows the histogram of the green channel of a color image. In the shown histogram, A, B and C are all peak points. Besides finding the global peak pixel value (point B), one must look for all peaks in the color image histograms.

After finding all peaks in the color image histograms, the following detected or computed values may be used to decide the original image background color.

$P_{Red}$, $P_{Green}$ and $P_{Blue}$: the global peak pixel values of the three channels;

$RP_{Red}$, $RP_{Green}$ and $RP_{Blue}$: the maximum local peak pixel values of the three channels that appear on the rightmost of the histogram;

$NP_{Red}$, $NP_{Green}$ and $NP_{Blue}$: the number of all peaks in the three channels;

$I_{Red}$, $I_{Green}$ and $I_{Blue}$: the index of $RP_{Red}$, $RP_{Green}$ and $RP_{Blue}$ in the descending sorted list of peaks;

$D_{pmax}$=max($|P_{Red}-P_{Green}|$, $|P_{Red}-P_{Blue}|$, $|P_{Green}-P_{Blue}|$): the maximum difference of global peak pixel values;

$D_{rpmax}$=max($|RP_{Red}-RP_{Green}|$, $|RP_{Red}-RP_{Blue}|$, $|RP_{Green}-RP_{Blue}|$): the maximum difference of the maximum local peak pixel values;

$D_{hrpmax}$=max($|H_r(RP_{Red})-H_g(RP_{Green})|$, $|H_r(RP_{Red})-H_b(RP_{Blue})|$, $|H_g(RP_{Green})-H_b(RP_{Blue})|$): the maximum difference of histograms values of the three maximum local peaks;

$H_{rp\_min}$=min($H_r(RP_{Red})$, $H_g(RP_{Green})$, $H_b(RP_{Blue})$): the minimum histogram values of three maximum local peaks;

$P_{max}$=max($P_{Red}$, $P_{Green}$, $P_{Blue}$): the maximum global peak pixel value;

$P_{min}$=min($P_{Red}$, $P_{Green}$, $P_{Blue}$): the minimum global peak pixel value;

$NP_{max}$=max($NP_{Red}$, $NP_{Green}$, $NP_{Blue}$): the maximum number of local peaks;

$NP_{min}$=min($NP_{Red}$, $NP_{Green}$, $NP_{Blue}$): the minimum number of local peaks;

$T_{low}$=170: a predefined low threshold of pixel value for N=255; and $T_{high}$=200: a predefined high threshold of pixel value for N=255.

In Table 1 below, all of the conditions that need to be checked to decide the two factors $F_l$ and $F_r$ for deciding the original color image background are provided:

| Conditions | Parameter Settings |
| --- | --- |
| $NP_{max} = 1$, $D_{pmax} < 15$, $P_{min} > T_{low}$ | $F_l := 1$, $F_r := 10$ |
| $NP_{max} = 1$, $D_{pmax} < 15$, $P_{max} < T_{low}$ | $F_l := 10$, $F_r := 10$ |
| $NP_{max} = 1$, $D_{pmax} < 15$, $P_{min} < T_{low}$, $P_{max} > T_{low}$ | $F_l := 1$, $F_r := 10$ if $P > T_{low}$ |
|  | $F_l := 10$, $F_r := 10$ otherwise |
| $NP_{max} = 1$, $D_{pmax} > 15$, $P_{min} > T_{high}$ | $F_l := 5$, $F_r := 10$ |
| $NP_{max} = 1$, $D_{pmax} > 15$, $P_{max} < T_{high}$ | $F_l := 10$, $F_r := 10$ |
| $NP_{max} = 1$, $D_{pmax} > 15$, $P_{min} < T_{high}$, $P_{max} > T_{high}$ | $F_l := 1$, $F_r := 10$ if $P > T_{high}$ |
|  | $F_l := 10$, $F_r := 10$ otherwise |
| $NP_{min} = 1$, $NP_{max} > 1$ | $F_l := 10$, $F_r := 10$ |
| $NP_{min} > 1$, $D_{rpmax} < 15$, $D_{hrpmax} < H_{hrpmin}/2$ or $I_{Red} = I_{Green} = I_{Blue}$ | $F_l := 10$, $F_r := 10$ |
| $NP_{min} > 1$, $D_{pmax} < 15$, $P_{min} > T_{low}$ | $F_l := 10$, $F_r := 10$ |
| $NP_{min} > 1$, $P_{min} > T_{high}$ | $F_l := 10$, $F_r := 10$ |
| $NP_{min} > 1$, $P_{max} > T_{low}$ | $F_l := 1$, $F_r := 10$ if $P > T_{low}$ |
|  | $F_l := 10$, $F_r := 10$ otherwise |
| All other cases | $F_l := 10$, $F_r := 10$ |

After the condition-checking operations, the values obtained for $F_l$ and $F_r$ are fed to the function FindCuttingPoint( ) to find the background range. These values are thus used to decide the enhanced image background color.

Decide Background of Enhanced Images (Step 807)

The determination of the enhanced image background is also a complicated condition-checking operation. The procedure for deciding the enhanced color image background is shown in Table 2. In the 'Enhanced Background' column, corresponding to color channels, $P_{eb}$ should be replaced with $P_{ebRed}$, $P_{ebGreen}$ or $P_{ebBlue}$, $P_b$ should be replaced with $P_{bRed}$, $P_{bGreen}$ or $P_{bBlue}$, and $P_{lb}$ should be replaced with $P_{lbRed}$, $P_{lbGreen}$ or $P_{lbBlue}$, respectively, as defined below. Before the checking, the following variables are computed or defined:

$P_{bRed}$, $P_{bGreen}$, $P_{bBlue}$: the detected original image background colors of the three channels;

$P_{ebRed}$, $P_{ebGreen}$, $P_{ebBlue}$: the decided enhanced image background colors of the three channels;

$P_{bmin}=\min(P_{bRed}, P_{bGreen}, P_{bBlue})$: the minimum original image background color;

$P_{bmax}=\max(P_{bRed}, P_{bGreen}, P_{bBlue})$: the maximum original image background color;

$P_{bmed}=\text{med}(P_{bRed}, P_{bGreen}, P_{bBlue})$: the median value of original image background color;

$D_{bmax}=\max(|P_{bRed}-P_{bGreen}|,|P_{bRed}-P_{bBlue}|,|P_{bGreen}-P_{bBlue}|)$: the maximum difference of the original image background colors;

$P_{wmin}=180$: the minimum pixel value that can be safely set to saturated value for N=255; and $P_{cut}$: the cutting pixel value to decide if a channel can be set to saturated value N=255, where $P_{cut}=1$ if $|P_{bmax}-P_{bmed}|>10$; $P_{cut}=P_{bmed}-1$, otherwise.

| PreCondition | Conditions | Enhanced Background |
|---|---|---|
| Black-and-white document | $P_{bmin} \geq P_{wmin}$ | $P_{ebRed} := P_{ebGreen} := P_{ebBlue} := N$ |
|  | $P_{bmax} < P_{wmin}$ | $P_{ebRed} := P_{ebGreen} := P_{ebBlue} := P_{bmax}$ |
|  | otherwise | $P_{eb} := N$ if $P_b > P_{wmin}$; $P_{eb} = P_b$ otherwise; |
| Non-black-and-white document $D_{bmax} \leq 15$ | $P_{bmin} \geq P_{wmin} + 20$ | $P_{ebRed} := P_{ebGreen} := P_{ebBlue} := N$ |
|  | $P_{wmin} \leq P_{bmin} \leq P_{wmin} + 20$ | $P_{ebRed} := P_{ebGreen} := P_{ebBlue} := N$ |
|  |  | $P_{lbRed} := P_{lbGreen} := P_{lbBlue} := P_{bmax}$ |
|  | otherwise | $P_{ebRed} := P_{ebGreen} := P_{ebBlue} := P_{bmax}$ |
| Non-black-and-white document $15 < D_{bmax} \leq 20$ | $P_{bmin} \geq P_{wmin} + 20$ | $P_{ebRed} := P_{ebGreen} := P_{ebBlue} := N$ |
|  | $P_{bmin} \geq P_{wmin} - 10$ | $P_{ebRed} := P_{ebGreen} := P_{ebBlue} := N$ |
|  | $P_{bmed} \geq P_{wmin}$ | $P_{lbRed} := P_{lbGreen} := P_{lbBlue} := P_{bmin}$ |
|  | otherwise | $P_{ebRed} := P_{ebGreen} := P_{ebBlue} := P_{bmax}$ |
| Non-black-and-white document $D_{bmax} > 20$ | $P_{bmin} \geq P_{wmin}$ | $P_{eb} := N$ if $P_b > P_{bmed}$; $P_{eb} = P_b$ otherwise; |
|  | $P_{bmax} < P_{wmin}$ | $P_{eb} := N$, $P_{lb} = P_b - 2$ if $P_b > P_{cut}$; $P_{ep} = P_b$ otherwise; |
|  | otherwise | $P_{eb} := N$ if $P_b > P_{wmin} + 20$; $P_{eb} = P_b$ otherwise; |

Background Enhancement (Step 810)

Once the enhanced image background color is determined, the enhancement operation is similar to the enhancement of grayscale images by creating a look-up table. However, to preserve the generic background color, a second-round color adjustment will be performed, if necessary. In particular, the enhancement is performed as follows:

1. First-round background enhancement. For each color channel, if $P_{eb}$ ($P_{ebRed}$, $P_{ebGreen}$ or $P_{ebBlue}$) is N (e.g., 255), generate a look-up table LT as follows, where i is the image pixel value of a specific color channel that is in the range [0, N], B is a small value that can always be safely set to pure black value 0 (e.g., for N=1, B may be 5), and $P_{lb}$ takes the value of $P_{lbRed}$, $P_{lbGreen}$ or $P_{lbBlue}$ depending on the color channel:

$$LT(i) = \begin{cases} 0 & i \leq B \\ N & i \geq P_{lb} \\ \frac{N \cdot (i - B)}{P_{lb} - B} & \text{Otherwise.} \end{cases} \quad (8)$$

If $P_{eb}$ is not N, generate a look-up table LT as follows, where $P_{lb}$ is the same as the previous case, and $P_{rb}$ takes the value of $P_{rbRed}$, $P_{rbGreen}$ or $P_{rbBlue}$ depending on the color channel:

$$LT(i) = \begin{cases} P_{eb} & \text{if } P_{lb} \leq i \leq P_{rb} \\ i & \text{Otherwise} \end{cases} \quad (9)$$

The first-round enhancement is performed whereby for each image pixel with value p in a specific color channel, the value is changed from p to LT(p) in that channel.

2. Second-round background color adjustment. Second-round background color adjustment is required only if one channel of background color is set to a saturated value N (e.g., 255) in the first-round enhancement. To determine if a second-round color adjustment is required, three color changing values in the first-round enhancement are first computed. For the red channel, the color changing value $C_{Red}$ is computed as:

$$C_{Red} = \begin{cases} N - P_{bRed} & \text{if } P_{ebRed} = N \\ 0 & \text{Otherwise} \end{cases} \quad (10)$$

For green and blue channels, the computation of $C_{Green}$ and $C_{Blue}$ are the same by replacing $P_{bRed}$ with $P_{bGreen}$ or $P_{bBlue}$ and replacing $P_{ebRed}$ with $P_{ebGreen}$ or $P_{ebBlue}$.

If any one of $C_{Red}$, $C_{Green}$ and $C_{Blue}$ has a non-zero value, then the second-round color adjustment is required. The procedure to perform the second-round color adjustment is as follows:

Compute a color saturation pixel threshold $P_s$ for the second-round color adjustment as $P_s = N - \max(C_{Red}, C_{Green}, C_{Blue})$;

Generate look-up table LT2 for the color adjustment. For the red color channel, if $C_{Red}$ is zero, generate the look-up table as follows, where i is the image pixel value of the red channel which is in the range [0, N]:

$$LT2(i) = \begin{cases} N & \text{if } i \geq P_s \\ \frac{i \cdot N}{P_s} & \text{Otherwise} \end{cases} \quad (11)$$

If $C_{Red}$ is not zero, the look-up table would be LT2(i)=i which means the pixel values in red color channel do not need to be adjusted. The same thing happens to the green and blue channel.

Once the three look-up tables are generated, the second-round color adjustment is exactly the same as the operation in the first-round enhancement. However, this time the input image is the first-round enhanced image instead of the original image.

Image Enhancement Examples

Figure 16:
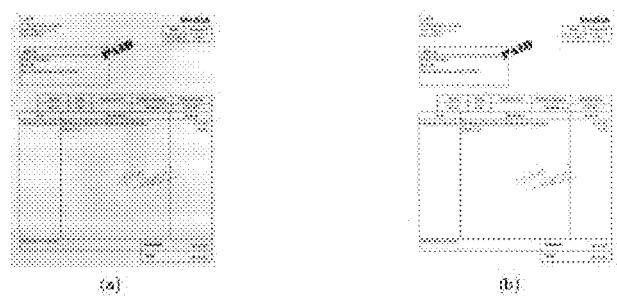
FIG. 16 illustrates a fifth color image background enhancement example where (a) is the original image scanned from a black-and-white document and (b) is the image enhanced using the techniques of the invention.

FIGS. 12-15 illustrate four examples of color image background enhancement where (a) is the original image and (b) is the image enhanced using the techniques of the invention, and FIG. 16 illustrates an example of image background enhancement of a color image scanned from a black-an-white document where (a) is the original image and (b) is the image enhanced using the techniques of the invention.

Various Embodiments

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. As illustrated in FIG. 3, a computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language. When implemented on a general-purpose processor, the program code may combine with the processor to provide a unique apparatus or machine that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for improving image processing in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the image processing using the methods of the present invention.

Although not required, the invention can be implemented via an operating system, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

Those skilled in the art will appreciate that other image processing features besides those specifically described herein may be used with the techniques described herein. Such variations are intended to be included within the scope of the invention as defined by the following claims.

What is claimed:

1. A computer-implemented method of enhancing the background of an original document image having a colored background, comprising:
   detecting the background color of the original document image by:
   obtaining color image histograms of red, blue and green colors of the original document image,
   smoothing said histograms,
   comparing the smoothed histograms to determine if they have the same shape, and
   if the histograms have the same shape, detecting the background color of the original document image for each color channel in a first way, while if the histograms do not have the same shape, detecting the background color of the original document image for each color channel in a second way;
   determining the desired enhanced background color of the original document image from a background pixel value $P_b$ that is in the center of the background color range; and
   enhancing the original document image to the desired enhanced background color.

2. The method of claim 1, wherein smoothing said histograms comprises calculating for an image histogram H, a smoothing range R, and a pixel resolution N, the smoothed histogram $H_s$ as:

$$H_s(i) = \frac{1}{2R+1} \sum_{j=i-R}^{i+R} H(j), (i = 0, 1, \ldots, N).$$

3. The method of claim 1, wherein detecting the background color of the original document image comprises finding all peaks in said color image histograms, determining factors $F_l$ and $F_r$ as a function of one or more of the peak pixel values in said color image histograms, and providing factor values $F_l$ and $F_r$ to a function to find the left pixel value $P_{lb}$ of the background color range and the right pixel value $P_{rb}$ of the background color range, whereby pixel values in the color range defined by $P_{lb}$ and $P_{rb}$ are determined to be part of the color image background.

4. The method of claim 3, wherein determining the desired enhanced background color $P_{eb}$ of the original document image comprises:

if $P_{eb}$ for a red, green, or blue color channel has a value of N, generating a look-up table LT as follows, where i is the image pixel value of a specific color channel that is in the range [0, N], B is a small value that can always be safely set to pure black value 0, and $P_{lb}$ takes the value of $P_{lbRed}$, $P_{lbGreen}$ or $P_{lbBlue}$ depending on the color channel:

$$LT(i) = \begin{cases} 0 & i \leq B \\ N & i \geq P_{lb} \\ \dfrac{N \cdot (i-B)}{P_{lb} - B} & \text{Otherwise;} \end{cases}$$

if $P_{eb}$ for the red, green or blue color channel does not have a value of N, generating a look-up table LT as follows, where $P_{rb}$ takes the value of $P_{rbRed}$, $P_{rbGreen}$ or $P_{rbBlue}$ depending on the color channel:

$$LT(i) = \begin{cases} P_{eb} & \text{if } P_{lb} \leq i \leq P_{rb} \\ i & \text{Otherwise} \end{cases} ; \text{ and}$$

enhancing the image background such that for each image pixel with value p in a specific color channel of the original document image the pixel value is changed from p to LT(p) in that channel.

5. The method of claim 4, wherein if one channel of background color is set to a saturated value N, computing a color changing value $C_{Color}$ for red, green, and blue, respectively, as:

$$C_{Color} = \begin{cases} N - P_{bColor} & \text{if } P_{ebColor} = N \\ 0 & \text{Otherwise} \end{cases} ; \text{ and}$$

if any calculated value of $C_{Color}$ has a non-zero value, then computing a color saturation pixel threshold $P_s$ as $P_s = N - \max(C_{Red}, C_{Green}, C_{Blue})$ and generating a look-up table LT2 for the color adjustment as follows, where i is the image pixel value of the color channel that is in the range [0, N]:

$$LT2(i) = \begin{cases} N & \text{if } i \geq P_s \\ \dfrac{i \cdot N}{P_s} & \text{Otherwise.} \end{cases}$$

6. A system for enhancing the background of an original document image having a colored background, comprising:
a memory that stores a binary representation of the original document image; and
a processor that detects the background color of the original document image by obtaining color image histograms of red, blue and green colors of the original document image, smoothing said histograms, comparing the smoothed histograms to determine if they have the same shape, and, if the histograms have the same shape, detecting the background color of the original document image for each color channel in a first way, while if the histograms do not have the same shape, detecting that the background color of the original document image for each color channel in a second way; determines the desired enhanced background color of the original document image from a background pixel value $P_b$ that is in the center of the background color range; and enhances the original document image to the desired enhanced background color.

7. The system of claim 6, wherein the processor smoothes said histograms by calculating for an image histogram H, a smoothing range R, and a pixel resolution N, the smoothed histogram $H_s$ as:

$$H_s(i) = \frac{1}{2R+1} \sum_{j=i-R}^{i+R} H(j), (i = 0, 1, \ldots, N).$$

8. The system of claim 6, wherein the processor detects the background color of the original document image by finding all peaks in said color image histograms, determining factors $F_l$ and $F_r$ as a function of one or more of the peak pixel values in said color image histograms, and providing factor values $F_l$ and $F_r$ to a function to find the left pixel value $P_{lb}$ of the background color range and the right pixel value $P_{rb}$ of the background color range, whereby pixel values in the color range defined by $P_{lb}$ and $P_{rb}$ are determined to be part of the color image background.

9. The system of claim 8, wherein the processor determines the desired enhanced background color $P_{eb}$ of the original document image by:

if $P_{eb}$ for a red, green, or blue color channel has a value of N, generating a look-up table LT as follows, where i is the image pixel value of a specific color channel that is in the range [0, N], B is a small value that can always be safely set to pure black value 0, and $P_{lb}$ takes the value of $P_{lbRed}$, $P_{lbGreen}$ or $P_{lbBlue}$ depending on the color channel:

$$LT(i) = \begin{cases} 0 & i \leq B \\ N & i \geq P_{lb} \\ \dfrac{N \cdot (i-B)}{P_{lb} - B} & \text{Otherwise;} \end{cases}$$

if $P_{eb}$ for the red, green or blue color channel does not have a value of N, generating a look-up table LT as follows, where $P_{rb}$ takes the value of $P_{rbRed}$, $P_{rbGreen}$ or $P_{rbBlue}$ depending on the color channel:

$$LT(i) = \begin{cases} P_{eb} & \text{if } P_{lb} \leq i \leq P_{rb} \\ i & \text{Otherwise} \end{cases} ; \text{ and}$$

enhancing the image background such that for each image pixel with value p in a specific color channel of the original document image the pixel value is changed from p to LT(p) in that channel.

10. The system of claim 9, wherein if one channel of background color is set to a saturated value N, the processor computes a color changing value $C_{Color}$ for red, green, and blue, respectively, as:

$$C_{Color} = \begin{cases} N - P_{bColor} & \text{if } P_{ebColor} = N \\ 0 & \text{Otherwise} \end{cases} ; \text{and}$$

if any calculated value of $C_{Color}$ has a non-zero value, then the processor computes a color saturation pixel threshold $P_s$ as $P_s = N - \max(C_{Red}, C_{Green}, C_{Blue})$ and generates a look-up table LT2 for the color adjustment as follows, where i is the image pixel value of the color channel that is in the range [0, N]:

$$LT2(i) = \begin{cases} N & \text{if } i \geq P_s \\ \dfrac{i \cdot N}{P_s} & \text{Otherwise.} \end{cases}$$

11. A computer readable storage medium containing instructions stored thereon that when processed by a processor cause said processor to implement a method of enhancing the background of an original document image having a colored background, the instructions comprising instructions for:
detecting the background color of the original document image by:
obtaining color image histograms of red, blue and green colors of the original document image,
smoothing said histograms,
comparing the smoothed histograms to determine if they have the same shape, and
if the histograms have the same shape, detecting the background color of the original document image for each color channel in a first way, while if the histograms do not have the same shape, detecting the background color of the original document image for each color channel in a second way;
determining the desired enhanced background color of the original document image from a background pixel value $P_b$ that is in the center of the background color range; and
enhancing the original document image to the desired enhanced background color.

12. The medium of claim 11, wherein the instructions for smoothing said histograms comprises instructions for calculating for an image histogram H, a smoothing range R, and a pixel resolution N, the smoothed histogram $H_s$ as:

$$H_s(i) = \frac{1}{2R+1} \sum_{j=i-R}^{i+R} H(j), (i = 0, 1, \ldots, N).$$

13. The medium of claim 11, wherein the instructions for detecting the background color of the original document image comprises instructions for finding all peaks in said color image histograms, determining factors $F_l$ and $F_r$ as a function of one or more of the peak pixel values in said color image histograms, and providing factor values $F_l$ and $F_r$ to a function to find the left pixel value $P_{lb}$ of the background color range and the right pixel value $P_{rb}$ of the background color range, whereby pixel values in the color range defined by $P_{lb}$ and $P_{rb}$ are determined to be part of the color image background.

14. The medium of claim 13, wherein the instructions for determining the desired enhanced background color $P_{eb}$ of the original document image comprises instructions for:
if $P_{eb}$ for a red, green, or blue color channel has a value of N, generating a look-up table LT as follows, where i is the image pixel value of a specific color channel that is in the range [0, N], B is a small value that can always be safely set to pure black value 0, and $P_{lb}$ takes the value of $P_{lbRed}$, $P_{lbGreen}$ or $P_{lbBlue}$ depending on the color channel:

$$LT(i) = \begin{cases} 0 & i \leq B \\ N & i \geq P_{lb} \\ \dfrac{N \cdot (i - B)}{P_{lb} - B} & \text{Otherwise;} \end{cases}$$

if $P_{eb}$ for the red, green or blue color channel does not have a value of N, generating a look-up table LT as follows, where $P_{rb}$ takes the value of $P_{rbRed}$, $P_{rbGreen}$ or $P_{rbBlue}$ depending on the color channel:

$$LT(i) = \begin{cases} P_{eb} & \text{if } P_{lb} \leq i \leq P_{rb} \\ i & \text{Otherwise} \end{cases} ; \text{and}$$

enhancing the image background such that for each image pixel with value p in a specific color channel of the original document image the pixel value is changed from p to LT(p) in that channel.

15. The medium of claim 14, wherein if one channel of background color is set to a saturated value N, further comprising instructions for computing a color changing value $C_{Color}$ for red, green, and blue, respectively, as:

$$C_{Color} = \begin{cases} N - P_{bColor} & \text{if } P_{ebColor} = N \\ 0 & \text{Otherwise} \end{cases} ; \text{and}$$

if any calculated value of $C_{color}$ has a non-zero value, then further comprising instructions for computing a color saturation pixel threshold $P_s$ as $P_s = N - \max(C_{Red}, C_{Green}, C_{Blue})$ and generating a look-up table LT2 for the color adjustment as follows, where i is the image pixel value of the color channel that is in the range [0, N]:

$$LT2(i) = \begin{cases} N & \text{if } i \geq P_s \\ \dfrac{i \cdot N}{P_s} & \text{Otherwise.} \end{cases}$$

* * * * *